(12) United States Patent
Doran et al.

(10) Patent No.: US 8,583,888 B2
(45) Date of Patent: Nov. 12, 2013

(54) METHOD TO QUALIFY ACCESS TO A BLOCK STORAGE DEVICE VIA AUGMENTATION OF THE DEVICE'S CONTROLLER AND FIRMWARE FLOW

(75) Inventors: Mark Doran, Olympia, WA (US); Vincent Zimmer, Federaly Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/403,869

(22) Filed: Feb. 23, 2012

(65) Prior Publication Data

US 2012/0198193 A1    Aug. 2, 2012

Related U.S. Application Data

(63) Continuation of application No. 13/100,138, filed on May 3, 2011, now Pat. No. 8,161,258, which is a continuation of application No. 10/746,754, filed on Dec. 24, 2003, now Pat. No. 8,001,348.

(51) Int. Cl.
    *G06F 12/14* (2006.01)
(52) U.S. Cl.
    USPC ........... 711/163; 711/161; 711/162; 711/164; 710/200
(58) Field of Classification Search
    USPC ................... 711/163, 161, 162, 164; 710/200
    See application file for complete search history.

(56) References Cited

U.S. PATENT DOCUMENTS

| | | | |
|---|---|---|---|
| 5,392,433 A | 2/1995 | Hammersley et al. | |
| 5,987,557 A | 11/1999 | Ebrahim | |
| 6,170,055 B1 | 1/2001 | Meyer et al. | |
| 6,775,750 B2 * | 8/2004 | Krueger | 711/152 |
| 6,938,039 B1 * | 8/2005 | Bober et al. | 707/704 |
| 7,032,218 B2 * | 4/2006 | Shirasawa et al. | 717/168 |
| 7,426,633 B2 * | 9/2008 | Thompson et al. | 713/2 |
| 7,757,118 B2 * | 7/2010 | Chiang et al. | 714/15 |
| 2002/0016877 A1 | 2/2002 | Porterfield | |
| 2002/0054444 A1 * | 5/2002 | Lee | 360/55 |
| 2004/0030962 A1 * | 2/2004 | Swaine et al. | 714/45 |
| 2004/0076043 A1 * | 4/2004 | Boals et al. | 365/200 |
| 2004/0148489 A1 * | 7/2004 | Damron | 712/24 |
| 2004/0260842 A1 | 12/2004 | Pettey et al. | |

OTHER PUBLICATIONS

"Final Office Action for U.S. Appl. No. 10/746,754", Aug. 17, 2006, Whole Document.

(Continued)

*Primary Examiner* — Jae Yu
(74) *Attorney, Agent, or Firm* — Blakely, Sokoloff, Taylor & Zafman LLP

(57) ABSTRACT

A method to qualify access to a block storage device via augmentation of the device's controller and firmware flow. The method employs one or more block exclusion vectors (BEVs) that include attributes specifying allowed access operations for corresponding block address ranges. Logic in accordance with the BEVs is programmed into the controller for the block storage device, such as a disk drive controller for a disk drive. In response to an access request, a block address range corresponding to the storage block(s) requested to be accessed is determined. Based on the BEV entries, a determination is made to whether the determined logical block address range is covered by a corresponding BEV entry. If so, the attributes of the BEV are used to determine whether the access operation is allowed.

17 Claims, 7 Drawing Sheets

(56) References Cited

OTHER PUBLICATIONS

"Final Office Action for U.S. Appl. No. 10/746,754", Jul. 26, 2007, Whole Document.
"Non-Final Office Action for U.S. Appl. No. 10/746,754", Feb. 8, 2007, Whole Document.
"Non-Final Office Action for U.S. Appl. No. 10/746,754", Feb. 28, 2006, Whole Document.
"Notice of Allowance for U.S. Appl. No. 10/746,754", Feb. 4, 2011, Whole Document.
"Notice Of Allowance for U.S. Appl. No. 13/100,138", Dec. 8, 2011, Whole Document.

* cited by examiner

METHOD TO QUALIFY ACCESS TO A BLOCK STORAGE DEVICE VIA AUGMENTATION OF THE DEVICE'S CONTROLLER AND FIRMWARE FLOW

RELATED APPLICATIONS

The present application is a continuation of, and claims priority to, U.S. patent application Ser. No. 13/100,138 filed May 3, 2011 now U.S. Pat. No. 8,161,258, entitled "Method to Qualify Access to a Block Storage Device via Augmentation of the Device's Controller and Firmware Flow", which is a continuation of U.S. patent application Ser. No. 10/746,754 filed Dec. 24, 2003, entitled "Method to Qualify Access to a Block Storage Device via Augmentation of the Device's Controller and Firmware Flow", which issued Aug. 16, 2011 as U.S. Pat. No. 8,001,348.

FIELD OF THE INVENTION

The field of invention relates generally to computer systems and, more specifically but not exclusively relates to a method to qualify access to a block device via augmentation of the device controller and firmware flow.

BACKGROUND INFORMATION

Block storage (input/output) devices are typically used as mass storage devices. For example, the most common block device is a hard disk drive. Other common block devices include optical storage devices, removable storage media devices (e.g., Iomega's zip drives, USB-based detachable solid state memory), CD-ROM devices, and floppy drives.

A typical block storage device access interface stack in accordance with conventional practices is shown in FIG. 1. The stack is divided into two major portions: software components 100 and hardware components 102. Software components 100 include an operating system (OS) having a kernel 106 and user space 108. A user application 110 runs in the user space 108, while an OS device driver 112 resides at the kernel level of the OS.

The hardware components 102 include a firmware device driver 114, a device controller 116, and a block storage device 118, such as a hard disk drive 120. The firmware device driver 114 and device controller 116 typically reside on a computer system motherboard 122. More specifically, the firmware device driver typically resides on a boot firmware device (e.g., "BIOS chip") on motherboard 120, while the device controller may comprise a separate component mounted on motherboard 122, or may be includes as part of the system's chip set.

The interface stack in FIG. 1 is used to abstract the underlying block storage from users running application in user space 108. For example, suppose user application 110 comprises a file access application such as Microsoft's Explorer, which depicts the file structure stored on mass storage devices like disk drive 120 as a file tree 124. The underlying file data are addressed as blocks on block storage device 118, hence the name "block device." However, the concept of addressable blocks of storage cannot directly support a workable user interface, such as file tree 124. Thus, components in the OS kernel, including OS device driver 112, are used to abstract the user interface from the underlying storage. These components include a FAT (file allocation table) 126, which maps files and folders to corresponding storage blocks via a block address map 128. A partition table 130 is also included. In addition to dividing the block address of block storage device 118 into necessary partition, partition table 130 may also be used to create logical partitions, such that the same physical block storage device may appear to applications running in operating system 104 as separate "virtual" storage devices.

Generally, the components at the OS kernel 106 layer control access to a systems block storage devices, using software abstractions. However, under most implementations, anyone running the computer system has access to data stored on a system's own block storage devices, while remote block storage devices hosted by other remote systems may be access if sharing is enabled for such devices (via the OS's on the remote systems), and if the user has proper credentials to use the share(s).

In addition to block address mapping, the OS kernel is responsible for file/directory access. That is, a component such as FAT 16 maintains file access attribute data that define the types of accesses that are allowed. For example, a file may have a "read-only" attribute that prevents the file from being modified. Other files may be "hidden," or otherwise only accessible to someone with the proper authority, such as a system administrator. Thus, the operating system is the gatekeeper for accessing block storage devices under conventional practices.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Figure 1:
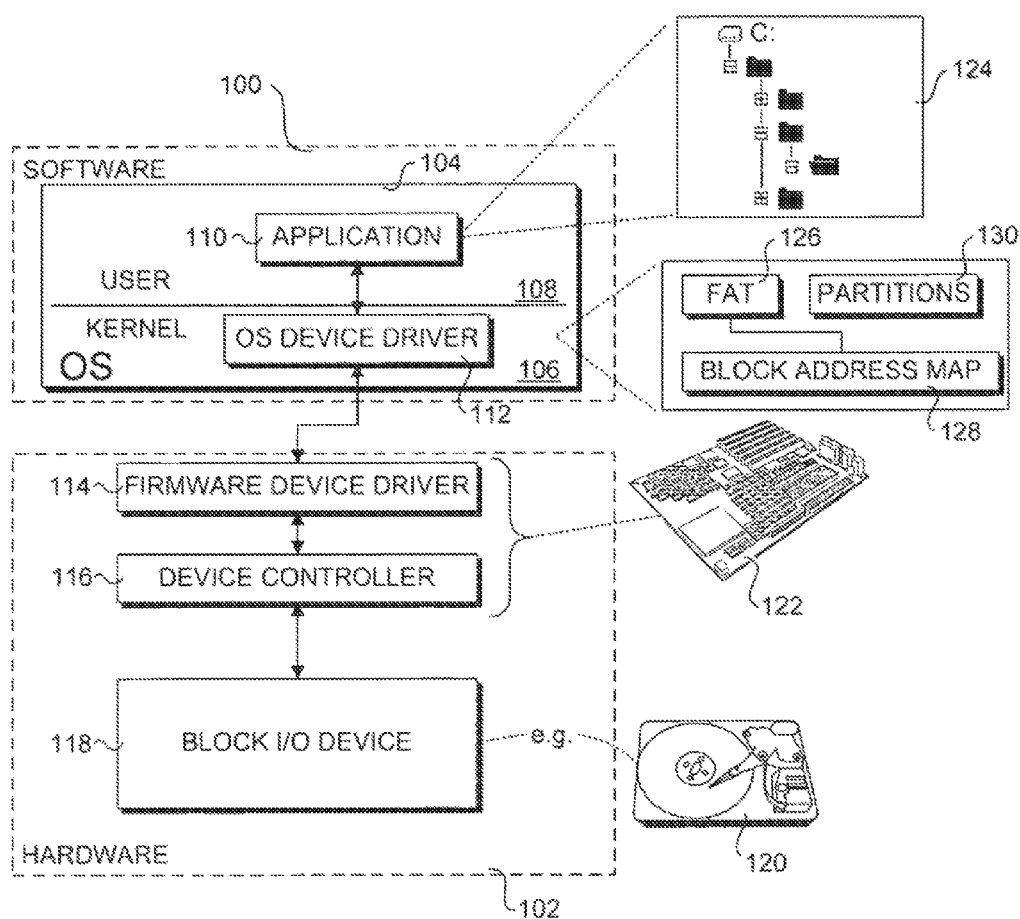
FIG. 1 is a schematic diagram illustrating a conventional block device access interface stack.

Embodiments of methods and systems to qualify access to block I/O devices via augmentation of the hardware device controller and firmware flow are described herein. In the following description, numerous specific details are set forth, such as implementations using the Extensible Firmware Interface (EFI) standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

This specification describes a system and method wherein software and hardware may be combined to qualify the mode of access to a block mode mass storage device. This method entails designating an arbitrary number of separate regions of the block device with attributes that control access to the data stored in those regions. The attributes include "Read-Only," "Read-Write," "Write-Only," accessible only to code with an established key token ("Key Accessible"), and "Inaccessible." These settings can be established by pre-boot or runtime firmware or an operating system and locked to a given state. In one embodiment, setting the attributes and locked state is a one-time operation and the state remains locked until the machine is rebooted. All attributes are cleared at system reboot.

In one embodiment, the block device access control mechanism is implemented via the block device's controller hardware by employing the concept of a Block Exclusion Vector (BEV) added to the state information managed by controller, such as that found in the Intel® Controller Hub (ICH) chipset ATA disk controller component. The mechanism can be implemented in any block mode storage device controller, so it can apply equally to integrated controllers such as those in Intel® chipsets or in third party controllers implemented as stand-alone controller chips or add-in cards. The mechanism does not rely on any features being implemented in the attached block devices, thus it can manage access to any existing device that is compatible with the data access interface of the particular controller (ATA, EIDE, SCSI, Fiber channel, etc.).

In one embodiment, the BEV provides fine-grained settings with optional authorization fields. One could think of this vector as being analogous to a primitive Access Control List (ACL) for raw I/O access to a block device managed by a controller that implements support for BEV. A region designated Write-Only, for example, would be ideal for the creation of an audit log that could not be altered after data is written to the log. The Read-Only attribute would be useful for storing firmware images on disk such that they could be executed without fear of tampering (i.e., integrity maintenance).

There is a temporal aspect to the settings of a given BEV entry in that these are established some time after the system boots. This means that the ability to access areas of the storage device may vary over time. For example, the platform firmware may wish to protect a region of mass storage from write access by code that runs subsequent to it while maintaining the ability to read and write the region as the firmware itself operates. This can be accomplished by waiting to set the BEV for the region to Read-Only until the firmware has completed its work whereupon all subsequent accesses to that region of the device are limited to read operations only.

The BEV mechanism provides the ability to qualify access to certain regions of the disk, such as an EFI system partition, so that errant software or malware cannot accidentally or maliciously change the state of information that is vital to correct system operation. It should be noted however, that this art is equally applicable to any block mode device controllers, so, for example, the access mechanism could be used to control access to regions of flash storage implemented and accessed as a block device. Thus, the mechanism may be implemented for accessing solid-state storage devices, such as the flash devices use today for digital cameras and PDAs (personal digital assistant) that employ a standard flash form factor (e.g. Compact flash) and are accessed as ATA devices.

One of the more powerful applications of this art in cost sensitive platforms would be to supplant the requirement for relatively expensive flash storage wired to the platform motherboard as a store for the boot code that runs when the CPU comes out of reset. Given a region of mass storage protected with a BEV entry, the data stored in this region can have the same level of integrity and protection from editing, removal or replacement as data stored in a flash device. In combination with the BEV, a mass storage controller may be implemented to map the CPU reset vector to an area of an attached mass storage device protected by such a BEV entry. Doing so will accomplish the same functionality as flash storage memory mapped at the reset vector and providing much larger storage capacities but at a fraction of the cost of current firmware hub flash technology devices.

An exemplary platform architecture 200A that may be employed for implementing embodiments of the invention is shown in FIG. 2. Platform architecture 200 includes a main processor 202 coupled, via a bus 204, to a memory controller hub (MCH) 206, commonly referred to as the "Northbridge" under well-known Intel® chipset schemes. MCH 206 is coupled via a bus 208 to system memory (i.e., RAM) 210. MCH 206 is further coupled to an Input/Output (I/O) controller hub (ICH) 212 via a bus 214. The ICH, which is commonly referred to as the "Southbridge," provides a hardware interface to various I/O buses, ports and devices. These include an IDE interface 216 to which an IDE hard disk 217 is coupled, a universal serial bus (USB) 218, etc. ICH 212 is further coupled to a network interface 220 via an I/O path 222. In addition, a firmware storage device 224 is communicatively coupled to ICH 212 via a low pin count (LPC) bus 226. In one embodiment, the LPC bus 226 is configured per Intel LPC Interface Specification Revision 1.0, Sep. 29, 1997. In the illustrated embodiment, firmware storage device 224 comprises a boot firmware device (BFD) contain bootable system firmware 225.

Figure 2A:
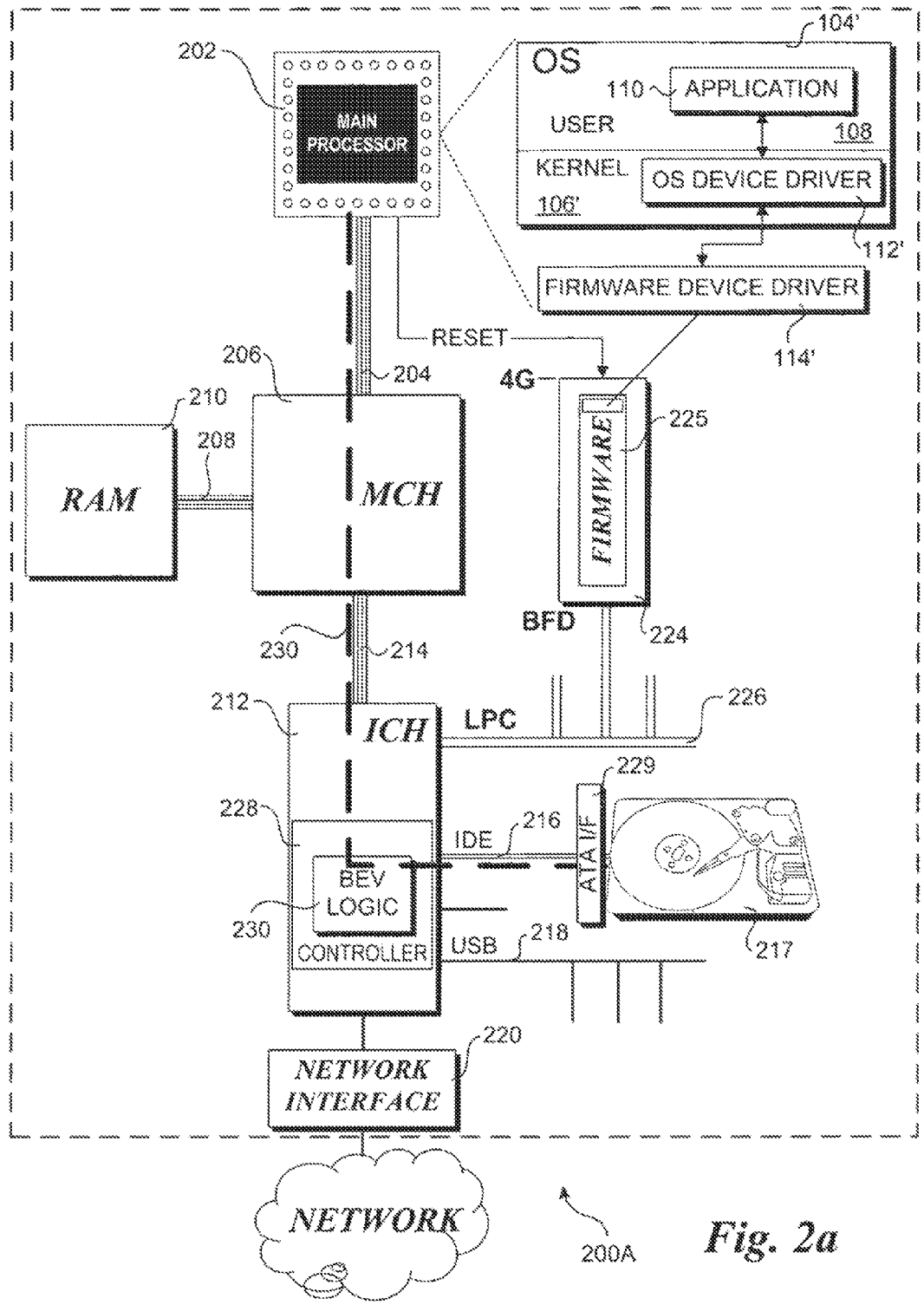
FIG. 2a is a schematic diagram of a platform architecture under which a block access qualification mechanism may be implemented, according to one embodiment of the invention.

Under the architecture illustrated in FIG. 2a, ICH 212 comprises an ASIC (application specific integrated circuit) containing embedded logic that is "programmed" in the ASIC using appropriate gate configurations, as is well-known in the art. A portion of ICH 212's embedded logic is dedicated to provide logic and control operations corresponding to a controller 228. In the illustrated embodiment, controller 228 comprises an IDE controller, while disk drive 217 employs an IDE or EIDE interface. Furthermore, controller 228 contains logic to effect interface operations with disk drive 217 in accordance with the ATA command set that is processed by an ATA interface 229. It is noted that this is merely illustrative of one implementation of the invention, as controller 228 may be programmed to effect other types of block device controllers, including but not limited to SCSI (small computer system interface) devices, Firewire (IEEE 1394) devices, and USB devices.

In accordance with one embodiment of the invention, the block device access mechanism may be implemented via BEV logic 230 programmed in controller 228. In effect, the BEV logic qualifies access requests based on the logic states of a corresponding BEV state machine. The logic states are defined by corresponding BEV entries.

Figure 3:
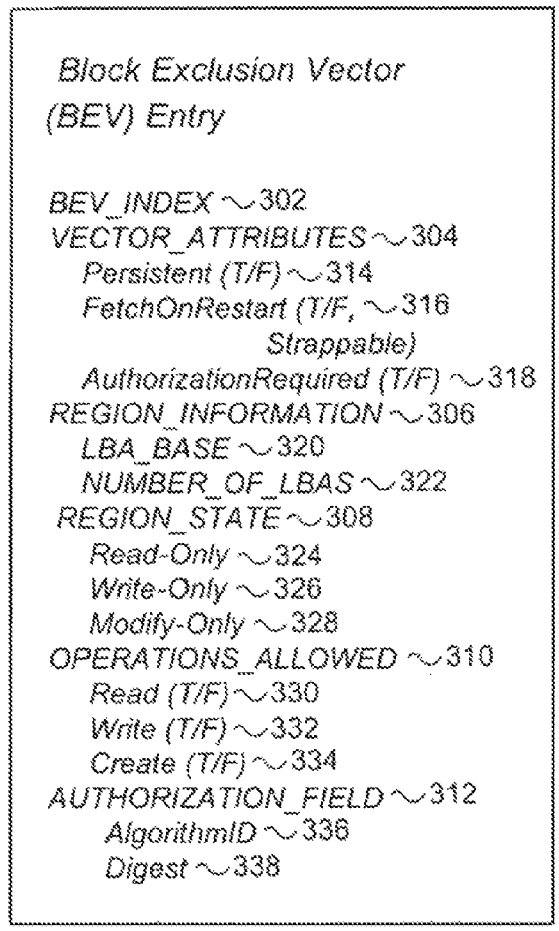
FIG. 3 is a table illustrating various attributes and data corresponding to a block exclusion vector (BEV) entry, according to one embodiment of the invention.

A BEV entry 300 according to one embodiment is shown in FIG. 3. The BEV entry 300 includes a BEV_INDEX 302, VECTOR_ATTRIBUTES 304, REGION_INFORMATION 306, REGION_STATE information 308, OPERATIONS_ALLOWED 310, and an optional AUTHORIZED_FIELD 312. BEV_INDEX 302 is used to maintain an index to the BEV entry.

The VECTOR_ATTRIBUTES 304 define attributes for the block exclusion vector, and include a Persistent attribute 314, a FetchOnReset attribute 316, and an AuthorizationRequired attribute 318. The Persistent attribute 314 comprises a Boolean bit indicating whether the entry is to persist (TRUE) or not (FALSE) across a restart (i.e., persist if the computer system is restarted). The FetchOnReset attribute 316 is used for implementations in which firmware may be stored on a block device, such as a disk drive 217, as described below. This attribute contains two values, a Boolean bit indicating TRUE or FALSE, and a bit indicating whether the block device is strappable. This refers to the ability to bootstap the system via bootable firmware that is stored on a block storage device rather than a conventional BIOS chip, as described below in detail. The AuthorizationRequired attribute comprises a Boolean bit indicating whether or not Authorization is required to access the portion of the block device indicated by the block storage request.

The REGION_INFORMATION 306 contains information corresponding to regions of the block storage device that are controlled via the access mechanism. This includes an LBA_BASE 320 that defines the base address for the logical block addresses (LBAs) provided by the device. A NUMBER_OF_LBAS 322 value specifies the number of logical block addresses available.

The REGION_STATE information 308 identifies corresponding region access states. These include Read-Only 324, Write-Only 326, and Modify-Only 328. The region states define whether or not a corresponding BEV entry may be read, written, or modified. The OPERATIONS_ALLOWED 310 entries include three Boolean bits correspond to respective access operations, including a Read operation 330, a Write operation 332, and a Create operation 334.

The optional AUTHORIZATION_FIELD 312 is used for implementations in which device access is enforced using an authorization scheme. In other words, an authorization scheme is employed to determine whether or not an access requestor is to be provided access to the block device. If the requestor passes an authorization challenge, the request is approved. If not, the request is denied. Exemplary entries for AUTHORIZATION_FIELD 312 include an AlgorithmID 336 and a Digest 338. The AlgorithmID 336 contains an identifier for a corresponding authentication algorithm. In general, the algorithm itself may be stored in firmware 224 or in an operating system. Digest 338 contains a digest that is generated via a hash on an authentication credential or the like, such as a private key.

Returning to FIG. 2a, a block storage device access in accordance with the illustrated embodiment proceeds as follows. As illustrated in the upper right-hand corner of the diagram, an operating system 104' has been loaded into system memory 210 and is running on main processor 202. Similarly, a firmware device driver 114' has been loaded into memory of execution via main processor 202.

The access process begins with when an application 110 running in user space 108 of operation system 104' makes an access request. The request is passed to OS device driver 112' in a kernel 106' of the OS. The OS device driver 112 then interfaces with firmware device driver 114 to pass the request. Typically, the firmware device driver 114 is designed to support a particular platform configuration (with respect the block storage device that is to receive the request), while the OS device driver 112' is somewhat generic to block storage devices of a certain type. In essence, the firmware device driver 114' abstracts the underlying block storage implementation from OS 104', such that the operating system doesn't need to be aware of the particular storage mechanism employed by the block storage device being accessed.

At this point, information is passed from main processor 202 to disk driver 217, as illustrated by a path 232. In response to receiving the access request, the firmware device driver 114 generates an appropriate access request and sends it along path 232 to ICH 212 via buses 204 and 214, and MCH 206. The access request is received and processed by controller 228, which generates an appropriate block storage device access command in response thereto. However, the request must first pass through BEV logic 230.

Figure 4:
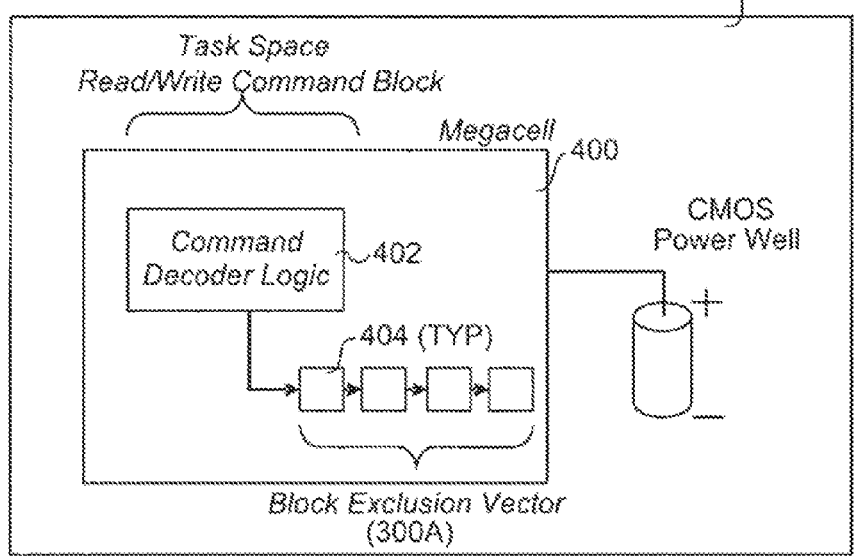
FIG. 4 is a schematic diagram illustrating an exemplary implementation of a BEV-based access qualification mechanism that is implemented in an Intel® controller hub ASIC, according to one embodiment of the invention.

An exemplary scheme for implementing BEV logic 230 is shown in FIG. 4. FIG. 4 shows block levels of an ASIC according to one embodiment of ICH 212. Details of other logic blocks of ICH 212 are removed for clarity. As is common to typical ASICS, device logic is obtained through programming appropriate gates in one or more megacells, such as depicted by a megacell 400. Groups of gates, in turn, are conventionally depicted as logic blocks, wherein each block contains logic for performing a corresponding function. For point of illustration, the megacell 400 contains gate logic for processing Read/Write commands. The logic blocks include Command Decoder Logic 402 and logic blocks 404, which are illustrative of a block exclusion vector entry 300A. In the illustrated embodiment, the ASIC is implemented using a CMOS process that enables the BEV logic to be not only reprogrammable, but also persistent across restarts. However, other processes for implementing ASIC designs in integrated circuits may also be employed.

Figure 5:
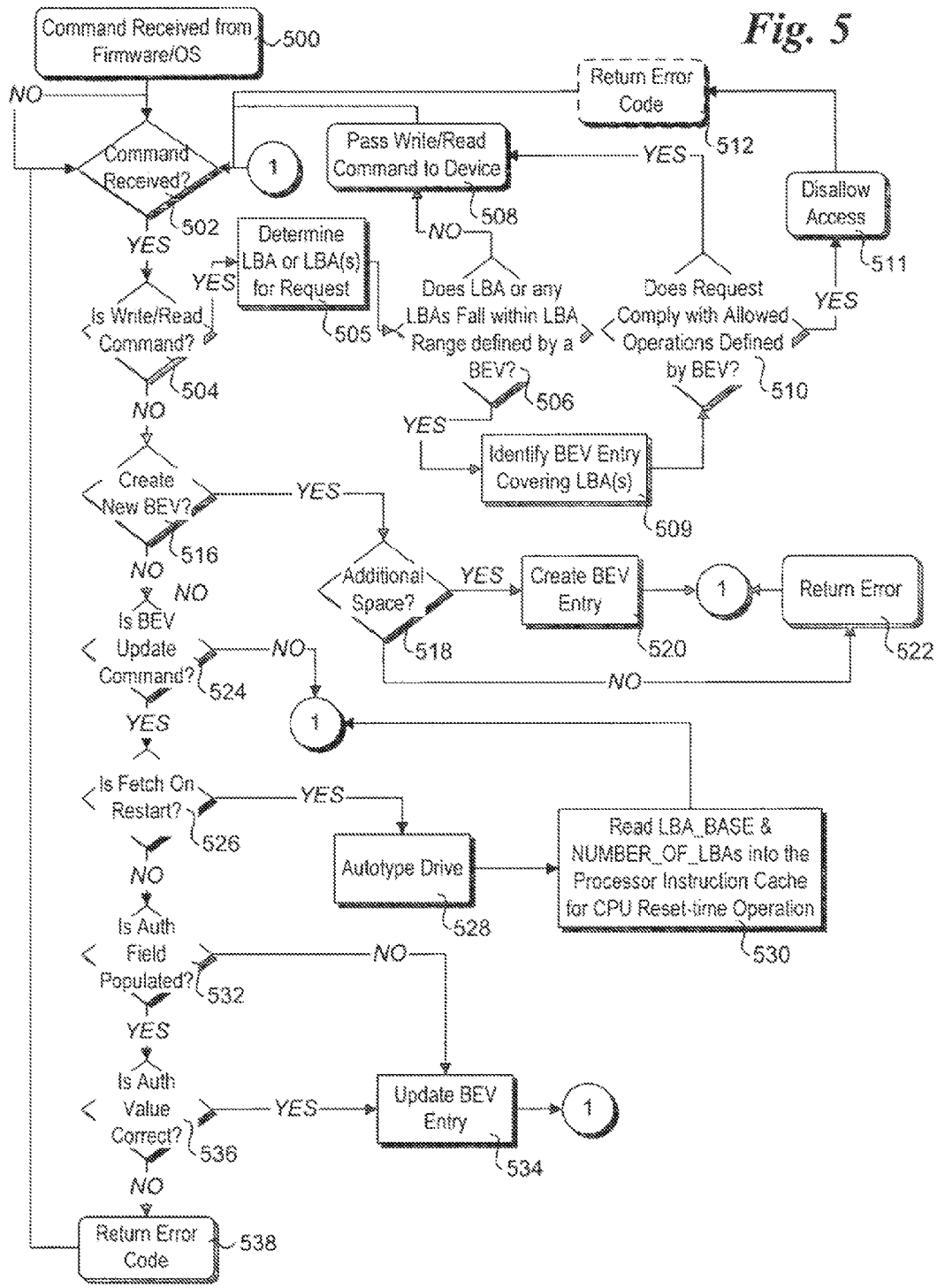
FIG. 5 is a flowchart illustrating operations and logic to qualify access to BEV entries, according to one embodiment of the invention.

Further details for processing an access requests are shown in the flowchart of FIG. 5. The process begins in a start block 500, which depicts a command received from the firmware or OS driver. (It is noted in some implementations, an OS driver may "talk" directly with the block device controller.) In a decision block 502, a determination is made to whether a command is received. In essence, decision block 502 is illustrative of a wait cycle or operations performed by a listener or the like.

In response to receiving a command, the logic proceeds to a decision block 504 in which a determination is made to whether the command is a Write or Read command. If the answer to decision block 504 is YES, the logic proceeds to a block 505 in which the LBA(s) corresponding to the access request is/are determined. For example, a typical access request might correspond to a file write or read request. Based on the FAT table entries, a base LBA for the file can be determined. In some cases, the file may be stored in a fragmented manner, wherein it doesn't occupy continuous blocks. Under these circumstances, the FAT table maintains a linked list that identifies the LBA for the storage locations of the file.

Next, in a decision block 506 a determination is made to whether the LBA or any LBAs fall within an LBA range defined for a BEV entry in the BEV logic 230. In short, this determination indicates whether or not the data being requested to be accessed falls within an address space that is under the control of a BEV entry. This determine is made by iterating through the BEVs via their respective indexes, and checking to see if there is an LBA range overlap between the address range of the requested block(s) and the address range defined by a given BEV entry. For example, the following check can be made:

Is requested LBA(s) in BEV[Index].Range?

If, after iterating through all of the BEV indexes, the foregoing evaluation does not result in a TRUE result, the answer to decision block 506 is NO, and the logic proceeds to a continuation block 508 in which normal block access operations are performed by passing the Write or Read command to the block storage device.

If the LBA or an LBA falls within the LBA range defined by a BEV entry, that BEV entry is identified in a block 509 by its index. A determination is then made in a decision block 510 to whether the access request complies with the allowed operations defined by that BEV. For example, the request may be a write request to a block having an LBA for which a corresponding BEV entry exist that specifies the Write attribute 332 to be FALSE, thus indicating that write operations to the block are not presently allowed. This evaluation is depicted below Is BEV[Index].Read==FALSE?

Similar logic may apply to read and creation requests. If the requested access operation is not allowed, the logic proceeds to a return block 511 in which access to the block device is disallowed. As an option, a corresponding error code may also be returned, as depicted by a return block 512. If the answer to decision block 510 is yes, the logic proceeds to continuation block 508 to perform normal block access operations.

If the answer to decision block 504 is NO, a determination to whether a NEW BEV entry is to be added is made in a decision block 516. If the answer is YES, a check to whether there is enough additional space to add the new BEV entry is made in a decision block 518. If sufficient space exists, the new BEV entry is created in a block 520, and the process returns to entry point 1. If there is insufficient space to add the new BEV entry, a corresponding error is returned in a return block 522.

If a new BEV has not been requested, the logic proceeds to a decision block 524 to determine wither the command is for a BEV entry update. If not, the logic returns to entry point 1. If the command is for a BEV entry update, the logic proceeds to a decision block 526 in which a determination is made to whether the FetchOnRestart attribute is set. If so, the logic flows to a block 528 in which the drive is autotyped. Autotyping the drive is the process of examining the disk geometry to determine how big it is by figuring out the identity, type and layout of the storage blocks through conversation between the controller/disk interactions. The LBA_BASE & NUMBER_OF_LBAs attributes are then loaded into the processor instruction cache for CPU reset-time operation in a block 530, and the logic returns to entry point 1.

If the FetchOnRestart attribute is not set, a determination is made in a decision block 532 to whether the AUTHORIZATION_FIELD 312 is populated. The determination in this decision block relates to whether a user must be authenticated to access or modify the BEV entries. Such authentication may be applicable for individual BEV entries, or all entries as a whole. In the case of individual BEV entries, respective authentication field data are provided for each BEV entry. The optional authentication fields support an implementation policy under which BEV entries cannot be inadvertently or maliciously changed by unauthorized parties. Furthermore, this authentication scheme supports the possibility of extending the basic mechanism in a way that permits attributes to be set more than once during a session, without requiring a platform reset.

If the answer to decision block 532 is NO, the logic proceeds to a block 534 in which the BEV entry is updated. If authorization field attributes exist, a determination is made in a decision block 536 to whether the authentication value is correct. For instance, authentication credentials may be compared using an authentication algorithm identified by AlgorithmID 336. In one embodiment, a platform public key is registered, and the BEV editor is challenged with an encrypted blob (e.g., Digest 338) that the BEV editor must decrypt with its private key. If the decrypted blob matches the private key, authentication is successful. If the authentication value does not match or is otherwise unsuccessful, an appropriate error code is returned in a return block 538. In general, the authorization algorithm and values may also evolve over time. In addition, other types of authentication schemes that are well-known in the art may be employed, including, but not limited to, authentication certificates, asymmetric key pair authentication, symmetric key pair authentication, shared secrets, and passwords/passcodes.

Figure 6:
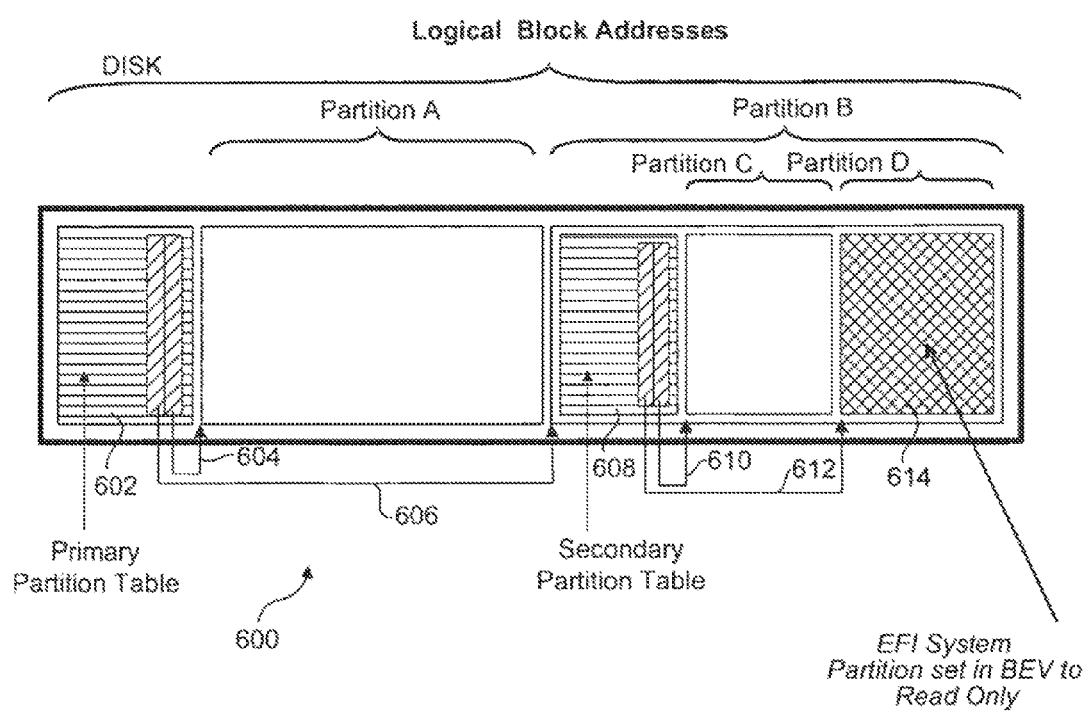
FIG. 6 is a schematic diagram illustrating an exemplary disk partitioning scheme that includes an EFI partition in which system firmware is stored.

In general, embodiments of the present invention may be used to qualify (e.g., restrict) access to specified regions of a block storage device based on corresponding BEV entry attributes. For example, a typical partitioning scheme 600 that may take advantage of the access mechanism is shown in FIG. 6. The partitioning scheme corresponds to a disk drive having a sequential range of logical block address space over its entirety. As is well-known in the art, the block address space of a physical drive may be divided into one or more logical partitions. For example, under Windows®-based operating systems, a physical drive can be divided into up to four primary logical partitions. In the illustrated embodiment, two primary partitions A and B are shown. In turn, a primary partition may be logically divided into multiple secondary partitions, as depicted by secondary partitions C and D.

Each disk drive includes a primary partition table 602. The primary partition table contains information defining the primary partitions on the disk. This information includes pointers 604 and 606, which identify the base addresses of primary partitions A and B, respectively. In a similar manner, each primary partition may include a secondary partition table when that primary partition is logically divided into secondary partitions. A secondary partition table 608 is illustrated in FIG. 6. As before, the secondary partition table will contain a set of pointers to the base addresses of the respective secondary partitions, as depicted by pointers 610 and 612.

In the illustrated example of FIG. 6, secondary partition D is defined as an EFI system partition (ESP) 614. The Extensible Firmware Interface is a public industry specification that describes an abstract programmatic interface between platform firmware and shrink-wrap operation systems or other custom application environments. EFI specifications and examples of EFI uses and implementations may be found at http://developer.intel.com/technology/efi. The EFI framework include provisions for extending firmware functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

In general, an EFI partition may be used to extend the functionality of the firmware supplied on a system's boot firmware device, which is commonly referred to as the system's BIOS chip. However, the qualified access mechanism described herein may be implemented to enable all or a boot portion of a system's firmware to be stored in an EFI system partition, in addition to providing qualified access to extended EFI drivers and modules stored in a typical EFI system partition.

Figure 2B:
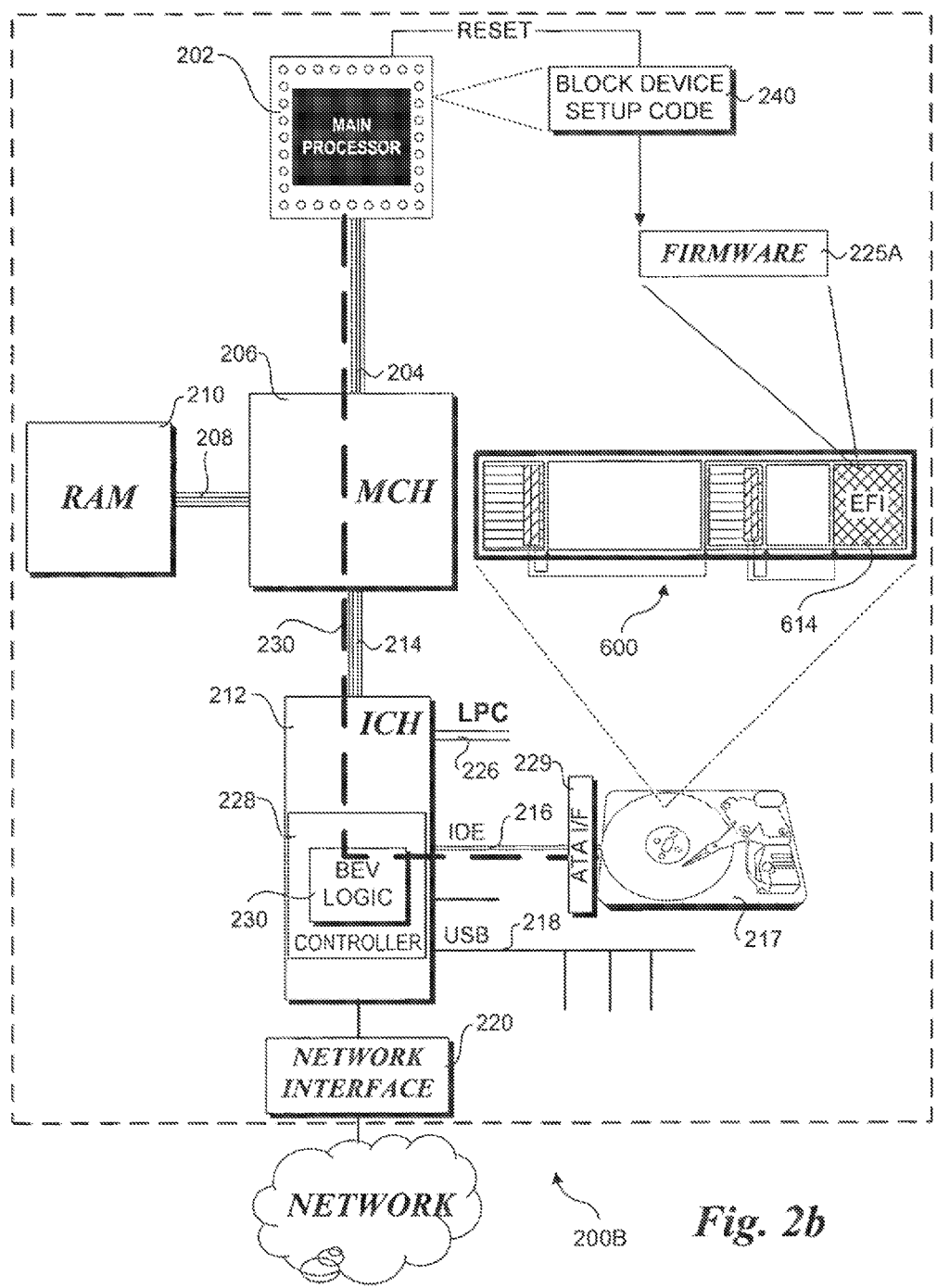
FIG. 2b is a schematic diagram showing a variation of the platform architecture of FIG. 2a, wherein system firmware is directly access from a disk drive, and a boot firmware device is not required.

An exemplary platform architecture 200B in which a disk drive 217A is used to host system firmware 225A is shown in FIG. 2b. Disk drive 217A is partitioned to have logical block addresses corresponding to the partitioning scheme 600 of FIG. 6. The bootable system firmware that would normally be found on a boot firmware device is stored in EFI system partition 614.

A comparison between the platform architectures of FIGS. 2a and 2b illustrates the difference between a conventional configuration (with respect to firmware usage), and an augmented scheme that leverages the BEV access mechanism described herein. Under the conventional scheme of FIG. 2a, in response to a restart event (i.e., a cold boot), a reset vector is immediately invoked by main processor 202 to jump the processor instruction path to system firmware 225 stored in BFD 224. In the illustrated embodiment, which corresponds to an IA-32 (Intel® architecture 32-bit) implementation, the reset vector jumps the processor to the address to 4 gigabytes, which corresponds to the top of the 32-bit address space. During the conventional firmware load, various system initialization operations are performed, such as the POST (power-on self test) operations, memory initialization, etc. These operations are performed in response to execution of corresponding firmware instructions contained in system firmware 225. During this pre-boot process, firmware device driver 114' is also loaded.

In contrast, platform architecture 200B does not include a boot firmware device. Rather, bootable firmware is accessed from EFI system partition 614 on disk drive 217A. Accordingly, operations are performed in response to a system restart to load the system firmware from disk drive 217A. However, unlike the conventional scheme of FIG. 2A, the reset vector cannot directly jump to the LBA of the beginning of EFI system partition 614. Rather, some rudimentary block device setup code 240 must first be executed to set up access to disk drive 217A. In one embodiment, block device setup code 240 is designed into main processor 202. In an optional embodiment, the block device setup code is stored on another component, such as a small flash device 242 or may be programmed into a processor chipset component, as depicted by block 244 in ICH 212. Accordingly, the reset vector is vectored to the base address of this optional component.

Figure 7:
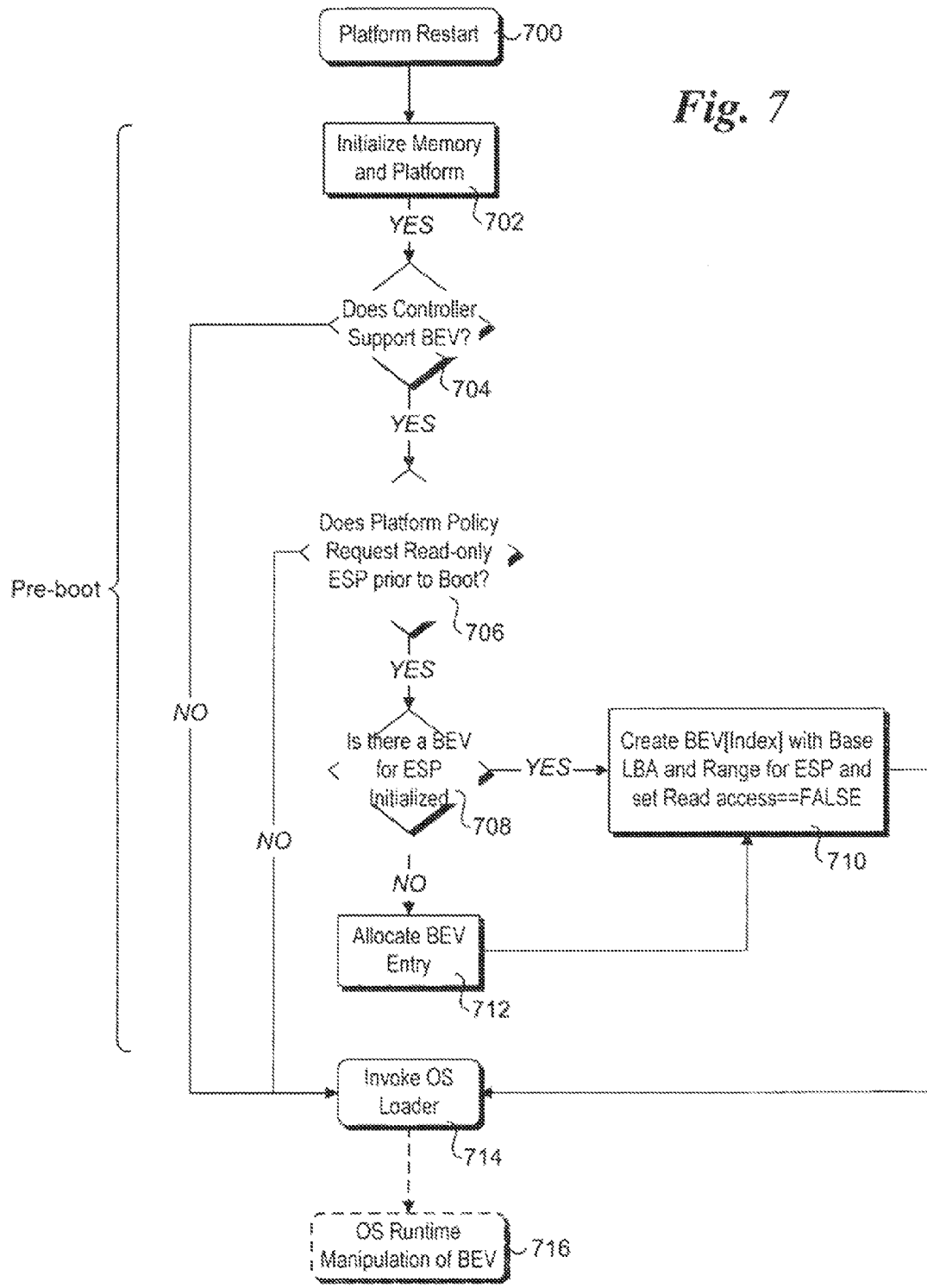
FIG. 7 is a flowchart illustrating operations and logic performed during a platform pre-boot phase related to the block access qualification mechanism, according to one embodiment of the invention.

Operations performed during a pre-boot phase of a computer system in accordance with one embodiment are shown in FIG. 7. The process begins with a platform restart in a start block 700. In response, early platform initialization operations are performed in a block 702, including initializing the system memory.

Next, in a decision block 704 a determination is made to whether the block device controller supports BEV usage. If not, the logic proceeds directly to a block 714 in which the operating system loader is invoked. If the system does support BEV usage, the logic proceeds to a decision block 706 in which a determination is made to whether the platform policy requests a Read-only EFI system partition prior to boot. If not, the logic again proceeds to block 714 to invoke the OS loader.

If the answer to decision block 706 is YES, a determination is made in a decision block 7908 to whether there is a BEV for the EFI system partition that is initialized. If so, a BEV index is created in a block 710 that includes a base LBA and a range for the ESP. The Read access is then set to FALSE to prevent subsequent access to the blocks defined by the range. If a BEV for ESP has not been initialized, the logic first proceeds to a block 712 in which an appropriate BEV entry is allocated, and hence to block 710. After the operations of block 710 have been performed, the OS loader is invoked in block 714. Subsequently, OS runtime manipulation of the BEV entries may be performed in a block 716.

In addition to implementation in ASICs and the like, embodiments of the present description may also be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The embodiment of the present invention described herein provide many advantages over the conventional art. For example, with commodity disk drives growing into the 100's of gigabytes and the use of multiple operating system deployment in certain markets, the ability to safely partition access to the raw sectors on such disks is imperative in order to safely utilize the storage offered by the disks.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
storing block exclusion vectors each corresponding to a different respective region of a plurality of regions of a block storage device, wherein each block exclusion vector (BEV) defines an address range to which it applies and one or more access attributes corresponding to the address range, wherein, for each of the plurality of regions, the BEV corresponding to the region specifies an access attribute identifying whether the region is to be accessed in response to a reset of a computer system including the storage device;
with the one or more block exclusion vectors, implementing an operating system-independent mechanism of the computer system to qualify access to the block storage device;
receiving a request for an access to a first region of the plurality of regions; and
with the mechanism, qualifying the requested access based on the one or more access attributes defined by the BEV corresponding to the first region.

2. The method of claim 1, wherein each BEV defines an address range with a base logical block address (LBA) and a number of logical blocks in the address range.

3. The method of claim 1, wherein each BEV includes authentication information related to authorization of access requesters.

4. The method of claim 3, wherein qualifying the requested access includes:
authenticating the request against the authentication information; and
enabling the access to the block storage device if the request is authenticated, otherwise denying the access to the block storage device.

5. The method of claim 1, wherein each BEV identifies whether the BEV is to persist across system restarts.

6. The method of claim 1, wherein the mechanism qualifies the access in a disk drive controller, and wherein the block storage device comprises a disk drive having sectors mapped into logical storage blocks.

7. The method of claim 1, wherein the mechanism qualifies the access in an Application Specific Integrated Circuit (ASIC).

8. The method of claim 1, wherein the mechanism qualifies the access in an input/output controller hub.

9. The method of claim 1, further comprising:
enabling access, via the mechanism to qualify access, to specified blocks on the block storage device during a pre-boot phase of a computer system initialization; and
denying access to the specified blocks after the pre-boot phase has been completed.

10. An integrated circuit, comprising:
logic circuitry to implement an operating system-independent mechanism to qualify access to a block storage device of a computer system, wherein the mechanism to qualify access based on block exclusion vectors each corresponding to different respective region of a plurality of regions of the block storage device, wherein each block exclusion vector (BEV) defines an address range to which the BEV applies and one or more access attributes corresponding to the address range, wherein, for each of the plurality of regions, the BEV corresponding to the region specifies an access attribute which identifies whether the region is to be accessed in response to a reset of the computer system, wherein the integrated circuit includes a plurality of rewritable cells in which the one or more BEVs are programmed, and wherein each BEV includes an attribute to indicate whether the BEV is to persist across system restarts.

11. The integrated circuit of claim 10, wherein the integrated circuit comprises an input/output controller hub (ICH).

12. The integrated circuit of claim 10, wherein the integrated circuit comprises a hard disk controller, and the block storage device comprises a corresponding hard disk that is accessed via the hard disk controller.

13. The integrated circuit of claim 10, wherein each BEV includes authentication information related to authorization of access requesters.

14. The integrated circuit of claim 10, wherein the access attributes define allowed operations including at least one of read, write, and create.

15. A system, comprising:
a processor having an instruction cache;
a block storage device; and
a controller, operatively coupled in communication with the processor and the disk drive, having logic programmed therein to implement an operating system-independent mechanism to qualify access to the block storage device, wherein the mechanism to qualify access based on block exclusion vectors each corresponding to different respective region of a plurality of regions of the block storage device, wherein each block exclusion vector (BEV) defines an address range to which the BEV applies and one or more access attributes corresponding to the address range, wherein, for each of the plurality of regions, the BEV corresponding to the region specifies an access attribute which identifies whether the region is to be accessed in response to a reset of the system, wherein the block storage device is a disk drive, and the controller comprises a disk controller, and wherein a bootable firmware image is stored on the disk drive, and the system is configured to perform operations in response to a system restart, including:
set up access to the disk drive; and
copy at least a portion of the bootable firmware image into the instruction cache.

16. The system of claim 15, wherein the controller comprises an input/output controller hub (ICH).

17. The system of claim 15, wherein the system does not include a boot firmware device.

* * * * *